US011274195B2

(12) United States Patent
Rosenmayer

(10) Patent No.: US 11,274,195 B2
(45) Date of Patent: Mar. 15, 2022

(54) THERMOPLASTIC ELASTOMER COMPOSITIONS HAVING MICRONIZED RUBBER POWDER

(71) Applicant: LEHIGH TECHNOLOGIES, INC., Tucker, GA (US)

(72) Inventor: C. Thomas Rosenmayer, Tucker, GA (US)

(73) Assignee: Lehigh Technologies, Inc., Tucker, GA (US)

( * ) Notice: Subject to any disclaimer, the term of this patent is extended or adjusted under 35 U.S.C. 154(b) by 211 days.

(21) Appl. No.: 16/610,190

(22) PCT Filed: May 3, 2018

(86) PCT No.: PCT/US2018/030786
§ 371 (c)(1),
(2) Date: Nov. 1, 2019

(87) PCT Pub. No.: WO2018/204575
PCT Pub. Date: Nov. 8, 2018

(65) Prior Publication Data
US 2020/0148864 A1 May 14, 2020

Related U.S. Application Data

(60) Provisional application No. 62/500,647, filed on May 3, 2017.

(51) Int. Cl.
*C08L 19/00* (2006.01)

(52) U.S. Cl.
CPC ......... *C08L 19/003* (2013.01); *C08L 2205/03* (2013.01); *C08L 2207/04* (2013.01); *C08L 2207/24* (2013.01)

(58) Field of Classification Search
CPC ............... C08L 19/003; C08L 2207/24; C08L 2205/03; C08L 2207/04
See application file for complete search history.

(56) References Cited

U.S. PATENT DOCUMENTS

| 7,244,790 | B2 | 7/2007 | Sunkara et al. |
| 7,445,170 | B2 | 11/2008 | Cialone et al. |
| 7,861,958 | B2 | 1/2011 | Waznys et al. |
| 9,108,386 | B2 | 8/2015 | Rosenmayer et al. |
| 9,175,155 | B2 | 11/2015 | Rosenmayer et al. |
| 9,783,660 | B2 | 10/2017 | Rosenmayer et al. |
| 9,815,974 | B2 | 11/2017 | Jasiunas et al. |
| 10,513,600 | B2 | 12/2019 | Rosenmayer et al. |
| 2006/0247378 | A1 | 11/2006 | Sunkara |
| 2014/0088258 | A1 | 3/2014 | Papp et al. |
| 2014/0228505 | A1 | 8/2014 | Papp |
| 2016/0017129 | A1 | 1/2016 | Rosenmayer et al. |

FOREIGN PATENT DOCUMENTS

| CN | 101987902 | 3/2011 | |
| CN | 103554690 | 2/2014 | |
| EP | 2711390 | 3/2014 | |
| WO | WO 98/50463 | 11/1998 | |
| WO | WO-9850463 A1 * | 11/1998 | ............ C08L 19/003 |
| WO | WO 2005/097887 | 10/2005 | |
| WO | WO 2006/086334 | 8/2006 | |

OTHER PUBLICATIONS

ASTM. "Standard Sieve Series Specifications" E-11-95 *ASTM/ISO* pp. 1-2.
ASTM. "Standard Test Methods for Vulcanized Rubber and Thermoplastic Elastomers—Tension" *ASTM Int'l.* D412 (2008) pp. 1-14.
EPO. "International Search Report and Written Opinion" *PCT/US2018/030786* (dated Aug. 21, 2018) pp. 1-8.
MICRODYNE™. "Micronized Rubber Powder Product Specifications -105, -180, -400" *Lehigh Tech.* (2017) pp. 1-3.

* cited by examiner

*Primary Examiner* — Robert D Harlan
(74) *Attorney, Agent, or Firm* — Dority & Manning, P.A.

(57) ABSTRACT

Thermoplastic elastomers comprising micronized or pulverized rubber powders are disclosed having physical properties equivalent to those of virgin thermoplastic elastomers. For example, the use of finer mesh MRP (e.g., particles of size that would pass through 40 mesh or smaller) to manufacture thermoplastic elastomers results in thermoplastic elastomers that have physical properties equivalent to those of virgin thermoplastic elastomers. Similarly, the use of a glycidyl functional terpolymer (optionally in combination with trimellitic anhydride or "TMA") to manufacture thermoplastic elastomers comprising MRP results in thermoplastic elastomers that have physical properties equivalent to those of virgin thermoplastic elastomers. Moreover, the use of styrene-ethylene/butylene-styrene thermoplastic (e.g., "SEBS") in place of the base polypropylene thermoplastic elastomer to manufacture thermoplastic elastomers comprising MRP also results in thermoplastic elastomers that have physical properties equivalent to those of virgin thermoplastic elastomers.

10 Claims, No Drawings

THERMOPLASTIC ELASTOMER COMPOSITIONS HAVING MICRONIZED RUBBER POWDER

PRIORITY INFORMATION

The present application is the national stage entry of International Patent Application No. PCT/US2018/030786, filed on May 3, 2018, which claims priority to U.S. Provisional Application Ser. No. 62/500,647, filed on May 3, 2017, both of which are incorporated herein in their entirety by reference thereto.

BACKGROUND OF THE INVENTION

Field of the Invention

This invention relates generally to thermoplastic elastomers and, more particularly, to thermoplastic elastomers comprising recycled vulcanizates, such as micronized or pulverized rubber powders.

Description of the Related Art

Reclaimed elastomer materials (e.g., "reclaimed materials," "ground tire rubber," "GTR," "micronized rubber powders," or "MRP"), which include vulcanized elastomer materials, are used in a variety of applications, including elastomer compositions (e.g., tire tread compounds for vehicle tires), plastics compositions (e.g., as fillers for polyolefins), asphalt fillers, and others. In many of these applications, the micronized rubber powders are used as filler in place of a portion of the virgin compound material. One of the primary reasons for the use of reclaimed elastomer materials is cost because rubber powders, whether GTR or MRP, are typically significantly less expensive than virgin (i.e., non-reclaimed) rubber or plastic and, when used as a filler in elastomer or plastic compositions, tend to reduce the overall manufacturing cost of the composition. Further, because micronized rubber powders typically are made from recycled or reclaimed material (e.g., vulcanized scrap from manufacturing processes and used tires or other elastomeric products such as EPDM compounds), reincorporating them into elastomer and plastic compositions reduces landfill waste and results in a more environmentally-friendly product. Finally, use of recycled GTR or MRP provides a strategic supply chain hedge against petroleum-based supply chain price and supply volatility.

Thermoplastic elastomers (also referred to as "TPEs") are a class of copolymers comprising materials with both thermoplastic properties (e.g., pliability about a specific temperature but solidity upon cooling) and elastomeric properties (e.g., viscosity, elasticity, weak inter-molecular forces, etc.). Thermoplastic elastomers, to be commercially viable, should have physical properties close to those of virgin thermoplastic elastomers (e.g., a tensile break energy of at least 4 MPa, in combination with a minimum elastic elongation of at least 100%). Reclaimed elastomer materials have not been frequently used as fillers in thermoplastic elastomers because the physical properties of those thermoplastic elastomers did not have physical properties equivalent to those of virgin thermoplastic elastomers.

Therefore, there is a long-felt but unresolved need for thermoplastic elastomers comprising micronized or pulverized rubber powders that have physical properties equivalent to those of virgin thermoplastic elastomers.

SUMMARY OF THE INVENTION

Particular embodiments of the present invention include thermoplastic elastomer compositions and methods for making same. Included are thermoplastic elastomer compositions that comprise a base elastomer, recycled vulcanizate, and a reactive terpolymer. Particular embodiments may further include a co-reactant such as an anhydride, a TMA, a PPA. Embodiments may include just one such co-reactant or combinations of them. Embodiments may also include a process aid.

In particular embodiments, the base elastomer may be a polyolefin elastomer, a polypropylene elastomer, a polyethylene elastomer and/or a SEBS.

The foregoing and other objects, features and advantages of the invention will be apparent from the following more detailed descriptions of particular embodiments of the invention.

DETAILED DESCRIPTION OF PARTICULAR EMBODIMENTS

Briefly described, and according to particular embodiments, aspects of the present disclosure generally relate to thermoplastic elastomers comprising micronized or pulverized rubber powders that have physical properties equivalent to those of virgin thermoplastic elastomers.

Generally, ground tire rubber, or GTR, comprises reclaimed elastomer materials of particle size distributions that range from a diameter of 2 mm to 0.5 mm and are produced in a variety of ways including grinding methods such as cryogenic grinding. Micronized rubber powder, or MRP, is termed as such because it generally comprises reclaimed elastomer materials with a significant fraction of particles less than 100 microns in size. MRP may also be produced by either ambient or cryogenic grinding methods. Powders such as GTR and MRP are commonly designated by their mesh size. For example, powders in the size range of 10-30 mesh generally are considered GTR, whereas 40-300 mesh materials generally are considered MRP. GTR typically is less expensive than MRP because of the higher manufacturing cost required for making the smaller particles. Because of this cost difference, GTR generally is used instead of MRP, unless the specific application requires properties than can only be achieved through the use of MRP.

Reclaimed elastomer materials used to manufacture GTR and MRP generally are obtained from previously-manufactured products (e.g., used and unused vehicle tires) and from vulcanized scrap generated during the manufacturing process (e.g., vulcanized scrap generated from the tire manufacturing process), and, thus, the GTR and MRP are generally vulcanized and lacking any functionalization or surface-activation. GTR and MRP are relatively inert (e.g., the particles are non-reactive with virgin matrix materials). As such, GTR and MRP have been limited in their use as a component in thermoplastic elastomer compositions because when added at high levels, the resultant thermoplastic elastomers exhibit diminished performance characteristics.

As described further in this disclosure, the use of finer mesh MRP (e.g., particles of size that would pass through 40 mesh or smaller) to manufacture thermoplastic elastomers results in thermoplastic elastomers that have physical properties equivalent to those of virgin thermoplastic elastomers. Similarly, the use of a glycidyl functional terpolymer (optionally, in combination with trimellitic anhydride "TMA,"

polyphosphoric acid "PPA," or other anhydrides) to manufacture thermoplastic elastomers comprising MRP results in thermoplastic elastomers that have physical properties equivalent to those of virgin thermoplastic elastomers. Moreover, the use of styrene-ethylene/butylene-styrene thermoplastic elastomer (e.g., "SEBS") in place of the base polypropylene thermoplastic elastomer to manufacture thermoplastic elastomers comprising MRP also results in thermoplastic elastomers that have physical properties equivalent to those of virgin thermoplastic elastomers.

Generally, in one embodiment, the properties of the thermoplastic elastomers disclosed herein are believed to be due to favorable reactions between the glycidyl group of the terpolymer and the rubber (e.g., MRP). The anhydride and/or PPA generally is a co-reactant that accelerates the reaction. Similar behaviors have been observed in asphalt systems in which the glycidyl group interacts with the asphaltenes. In one embodiment, the carbon black in the rubber and asphaltenes do have some similarities in structure (e.g., some potentially reactive polar groups on the carbon rings), which is why it is believed that the properties of the thermoplastic elastomers disclosed herein are due to favorable reactions between the glycidyl group of the terpolymer and the rubber.

The disclosed thermoplastic elastomers comprise MRP in place of some of the base elastomer and/or polymer and are suitable for manufacturing via both extrusion and injection molding. As used herein, the term "MicroDyne" or "MD" refers to a brand name of vulcanized elastomer particles (e.g., cured rubber particles, recycled rubber particles, ground tire rubber, GTR, micronized rubber powder, or MRP) produced by Lehigh Technologies, Inc., of Tucker, Ga. According to particular embodiments, the particles described herein are produced via a cryogenic grinding system described by U.S. Pat. No. 7,445,170, entitled "Process and Apparatus for Manufacturing Crumb and Powder Rubber," and an impact mill as described by U.S. Pat. No. 7,861,958, entitled "Conical-Shaped Impact Mill." In other embodiments of the present disclosure, these micronized rubber powders are produced via a variety of other known processes and techniques as will occur to one of ordinary skill in the art, and the powders used herein are not limited to the specific cryogenic grinding processes described herein.

As also used herein and recited in the attached exhibits, "MD-400" generally refers to a reclaimed elastomer material composition (i.e., micronized rubber powder) conforming to conventional mesh standards (e.g., the American Standard Sieve Series, ASTM E11:95) with particles of a size that would pass through sieves with larger openings but would be retained by a 40-mesh sieve (e.g., with openings of size 0.425 mm), "MD-180" generally refers to MRP conforming to conventional mesh standards with particles of a size that would pass through sieves with larger openings but would be retained by a 80-mesh sieve (e.g., with openings of size 0.180 mm), "MD-105" generally refers to MRP conforming to conventional mesh standards with particles of a size that would pass through sieves with larger openings but would be retained by a 140-mesh sieve (e.g., with openings of size 0.106 mm), and so on. Further, "TR" generally refers to MRP manufactured from tire rubber and "EP" generally refers to MRP manufactured from ethylene propylene diene monomer (e.g., "EPDM") rubber. Thus, MD-400-TR, MD-180-EP, MD-105-TR, MD-105-EP, etc. are proprietary brand names used to describe specific reclaimed elastomer material compositions (whether GTR or MRP) produced by Lehigh Technologies, Inc., which comprise particles of the identified predetermined particle size distributions and rubber compositions. As will be understood and appreciated, the specific formulations associated with MD-400, MD-180, MD-105, or any other formulation are presented purely for illustrative purposes and elastomeric compositions, reclaimed elastomer material compositions, or other elastomer formulations contemplated by the present disclosure are not limited to the specific characteristics or features recited herein.

Aspects of the present disclosure include several novel material combinations for thermoplastic elastomers that allow for use of MRP and other materials that enable the resulting elastomers to behave like virgin thermoplastic elastomers. First, the use of finer mesh MRP (e.g., particles of size that would pass through 40 mesh or smaller) to manufacture thermoplastic elastomers results in thermoplastic elastomers that have physical properties equivalent to those of virgin thermoplastic elastomers.

Second, the use of a glycidyl functional terpolymer (e.g., ELVALOY® 5170, etc.), optionally in combination with TMA, PPA, or other anhydrides to manufacture thermoplastic elastomers comprising MRP results in thermoplastic elastomers that have physical properties equivalent to those of virgin thermoplastic elastomers.

Third, the use of styrene-ethylene/butylene-styrene thermoplastic elastomer (e.g., "SEBS", KRATON™ MD1653, etc.) in place of the base polypropylene thermoplastic elastomer to manufacture thermoplastic elastomers comprising MRP also results in thermoplastic elastomers that have physical properties equivalent to those of virgin thermoplastic elastomers.

Exemplary Thermoplastic Elastomer Formulations.

Exemplary thermoplastic elastomers according to the present disclosure were manufactured for testing with the following formulations and procedures:

Generally, as shown in Tables 1 & 2 and as used in the exemplary thermoplastic elastomer formulations, VISTAMAXX™ 6502 refers to the brand name of a base elastomer manufactured by Exxon-Mobil; KRATON™ MD 1653 refers to the brand name of a base elastomer manufactured by Kraton; ELVALOY® 5170 refers to the brand name of a reactive terpolymer; manufactured by DuPont; and STRUKTOL® TR016 refers to the brand name of a compatibilizer manufactured by Struktol. This disclosure places no limitations on the types, brands, or formulations of base elastomers, reactive terpolymers, and compatibilizer used in the exemplary thermoplastic elastomer formulations as those base elastomers, reactive terpolymers, and compatibilizer used in the exemplary thermoplastic elastomer formulations are for exemplary purposes only.

TABLE 1

Exemplary Thermoplastic Elastomer Formulations, grams

| Material | Exemplary Purpose | TPE 1 | TPE 2 | TPE 3 | TPE 4 | TPE 5 | TPE 6 | TPE 7 |
|---|---|---|---|---|---|---|---|---|
| Vistamaxx ™ 6502 | Base Elastomer | 245 | 215 | 175 | | 97 | 97 | 175 |
| Kraton ™ MD 1653 | Base Elastomer | | | | 97 | | | |

TABLE 1-continued

Exemplary Thermoplastic Elastomer Formulations, grams

| Material | Exemplary Purpose | TPE 1 | TPE 2 | TPE 3 | TPE 4 | TPE 5 | TPE 6 | TPE 7 |
|---|---|---|---|---|---|---|---|---|
| Polypropylene | Polymer | | | | 128 | 128 | 128 | |
| Elvaloy ® 5170 | Reactive Terpolymer | | 30 | 15 | 15 | 15 | 15 | 15 |
| TMA | Co-Reactant | | | 7.5 | 7.5 | 7.5 | 7.5 | 7.5 |
| Struktol ® TR016 | Compatibilizer | 5 | 5 | 2.5 | 2.5 | 2.5 | 2.5 | 2.5 |
| MD-400-TR | MRP Filler | 750 | 750 | 300 | | 250 | 7 | |
| MD-105-TR | MRP Filler | | | | 250 | | 250 | 300 |
| | Totals | 1000 | 1000 | 500 | 500 | 500 | 500 | 500 |

TABLE 2

Alternative Exemplary Thermoplastic Elastomer Formulations, grams

| Material | Exemplary Purpose | TPE 8 | TPE 9 | TPE 10 | TPE 11 |
|---|---|---|---|---|---|
| Vistamaxx ™ 6502 | Base Elastomer | 110 | 110 | 175 | 148 |
| Polypropylene | Polymer | 115 | 115 | | 77 |
| Elvaloy ® 5170 | Reactive Terpolymer | 15 | 15 | 15 | 15 |
| Struktol ® TR016 | Process Aid | 2.5 | 2.5 | 2.5 | 2.5 |
| TMA | Co-Reactant | 7.5 | 7.5 | 7.5 | 7.5 |
| MD-180-EP | MRP Filler | | | 250 | 300 | 250 |
| MD-105-EP | MRP Filler | 250 | | | |
| | Totals | 500 | 500 | 500 | 500 | exemplary thermoplastic elastomer formulations from the compounded pellets as follows: feeding the compounded pellets into a conventional thermoplastic injection molding machine, heating the pellets to approximately 160° C.-180° C. to form a melt, injection molding the melt to form a molded sheet, and die cutting test specimens using a conventional die cutting apparatus.

Exemplary Thermoplastic Elastomer Testing Procedures.

The physical properties of the previously-described exemplary thermoplastic elastomer formulations were tested using the test method ASTM D412-16, Die C. Generally, five samples of each exemplary thermoplastic elastomer formulation were tested.

Exemplary Thermoplastic Elastomer Test Results.

The exemplary results of the previously-described tests are as follows:

TABLE 3

Exemplary Thermoplastic Elastomer Formulations (median values)

| | TPE 1 | TPE 2 | TPE 3 | TPE 4 | TPE 5 | TPE 6 | TPE 7 | TPE 8 | TPE 9 | TPE 10 | TPE 11 |
|---|---|---|---|---|---|---|---|---|---|---|---|
| Tensile Strength, MPa | 4 | 4 | 5 | 12.4 | 9 | 11.5 | 5.7 | 9.4 | 8.7 | 5 | 7 |
| Elongation at Break, % | 364 | 400 | 394 | 337 | 325 | 345 | 495 | 400 | 356 | 415 | 342 |
| Break Energy, MPa | 6.6 | 8.8 | 9.9 | 20.9 | 11.0 | 19.8 | 14.1 | 18.8 | 15.5 | 10.4 | 12.0 |

Referring to Tables 1 & 2, it may be seen that exemplary thermoplastic elastomer formulation TPE1 comprises no reactive terpolymer or TMA, while all other exemplary thermoplastic elastomer formulations comprise reactive terpolymer and/or TMA.

The samples of the exemplary thermoplastic elastomer formulations were formed from compounded pellets that were prepared with a conventional thermoplastic processing technique of, in various embodiments: blending of the components listed in Table 1 (e.g., typically either in either pellet or powder form), feeding the blend into a conventional heated twin screw extruder with a temperature of approximately 160° C.-180° C. to form a blended thermoplastic melt, extruding the melt in strand form into a cooling water bath, and chopping the cooled, extruded strands into compounded pellets. As will occur to one having ordinary skill in the art, this disclosure places no limitation on the thermoplastic processing technique. For example, other conventional thermoplastic extrusion techniques may be used to form the compounded pellets.

A conventional thermoplastic injection molding process, in various embodiments, was used to form the samples of the Generally, as shown in Table 3, the median value for each tested property is shown from the tests of the five samples of each of the exemplary thermoplastic elastomer formulations. In one embodiment, as shown in Table 3, the Tensile Strength refers to the maximum engineering tensile stress that a particular sample could withstand before breaking, wherein breaking is defined as sample rupture. Similarly, as shown in Table 3, in one embodiment, Elongation at Break is a measurement of the percent elongation of a thermoplastic elastomer sample (in comparison to its un-elongated stated) at the point that the thermoplastic elastomer sample breaks, wherein breaking is defined as sample rupture. Further, as shown in Table 3, Break Energy refers to the area under the stress-strain curve, which, in one embodiment, is approximated as:

$$\frac{\text{Median Tensile Strength} \times \text{Median Elongation at Break}}{2}$$

Median Break Energy is generally used to compare results, considering that materials with a relative higher Median Break Energy represent an improvement.

Referring to Table 3, in one embodiment, exemplary thermoplastic elastomer formulation TPE1 has a median break energy of 6.6 MPa, and all other exemplary thermoplastic elastomer formulations have significantly higher break energies.

Comparative Thermoplastic Elastomer Test Results.

As shown in Table 4, the exemplary comparative/control thermoplastic elastomers tested were manufactured by GDC, Inc., of Goshen, Ind. (e.g., ENDURAPRENE 3370, 3380, and 3390), or Jabat, Inc., of Olney, Ill. (e.g., JABAT MR-POE (J2) and JABAT MR-POE-MP (J4)). Generally, as shown in Table 4, the exemplary comparative thermoplastic elastomer test results were gathered using the test method ASTM D412-16, Die C and the median value for each tested property is shown from the tests of the five samples of each of the exemplary comparative/control thermoplastic elastomers.

TABLE 4

Exemplary Comparative Thermoplastic Elastomer Test Results

|  | Endura-prene 3370 | Endura-prene 3380 | Endura-prene 3390 | Jabat MR-POE (J2) | Jarat MR-POE-MP (J4) |
| --- | --- | --- | --- | --- | --- |
| Tensile Strength, MPa | 2.1 | 2.4 | 4.3 | 3.4 | 4.7 |
| Elongation at Break, % | 428 | 443 | 120 | 257 | 295 |
| Break Energy, MPa | 4.494 | 5.316 | 2.58 | 4.369 | 6.9325 |

In various embodiments, the comparative/control thermoplastic elastomers for which test results are shown in Table 4 generally represent thermoplastic elastomers formulations without finer mesh MRP, glycidyl functional terpolymer, TMA, PPA, other anhydrides, and/or SEBS. As shown in Table 4, in various embodiments, the median break energies of the comparative/control thermoplastic elastomers are almost all lower (e.g., less desirable) than the median break energies of the exemplary thermoplastic elastomer formulations.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A thermoplastic elastomer, comprising a base elastomer, recycled vulcanizate, and a reactive terpolymer, wherein the reactive terpolymer is glycidyl functional terpolymer.

2. The composition of claim 1, further comprising a co-reactant.

3. The composition of claim 2, wherein the co-reactant is selected from the group consisting of an anhydride, a polyphosphoric acid, and combinations thereof.

4. The composition of claim 1, further comprising a process aid.

5. The composition of claim 1, wherein the base elastomer is selected from the group consisting of a polyolefin elastomer, a styrene-ethylene/butylene-styrene thermoplastic elastomer, and combinations thereof.

6. The composition of claim 1, wherein the recycled vulcanizate is derived from tire rubber compounds.

7. The composition of claim 1, wherein the recycled vulcanizate is derived from ethylene propylene diene monomer compounds.

8. The composition of claim 1, wherein the recycled vulcanizate is 60 mesh or finer.

9. The composition of claim 3, wherein the anhydride is a trimellitic anhydride.

10. The composition of claim 5, wherein the polyolefin elastomer is selected from the group consisting of a polypropylene elastomer, a polyethylene elastomer, and combinations thereof.

\* \* \* \* \*